United States Patent [19]

Irimajiri et al.

[11] Patent Number: 4,630,702
[45] Date of Patent: Dec. 23, 1986

[54] THREE-WHEELED MOTOR VEHICLE GEAR SHIFT MECHANISM

[75] Inventors: Shoichiro Irimajiri, Mie; Katsusuke Komuro; Kunihiko Aikawa, both of Tokyo, all of Japan

[73] Assignee: Honda Giken Kogyo Kabushiki Kaisha, Tokyo, Japan

[21] Appl. No.: 605,404

[22] Filed: Apr. 30, 1984

[30] Foreign Application Priority Data

Apr. 28, 1983 [JP] Japan .................................. 58-63059

[51] Int. Cl.⁴ ...................... B62D 61/06; B60K 17/00
[52] U.S. Cl. .................................. 180/215; 74/473 R; 180/336
[58] Field of Search ............. 180/336, 215; 74/473 R

[56] References Cited

U.S. PATENT DOCUMENTS

| | | | |
|---|---|---|---|
| 1,635,483 | 7/1927 | Kesling | 74/473 R |
| 2,101,057 | 12/1937 | Fuller | 180/215 |
| 3,450,223 | 6/1969 | Jones | 180/215 |
| 3,924,706 | 12/1975 | Figura | 180/336 |
| 4,438,657 | 3/1984 | Nobis | 74/473 R |

FOREIGN PATENT DOCUMENTS

| | | | |
|---|---|---|---|
| 2345306 | 3/1976 | France | 180/336 |
| 421799 | 9/1932 | United Kingdom | 180/215 |

Primary Examiner—Craig R. Feinberg
Attorney, Agent, or Firm—Lyon & Lyon

[57] ABSTRACT

A three-wheeled motor vehicle having a vehicle body and an engine mounted on the vehicle body. A pair of laterally spaced wheels is disposed on the front of the vehicle body and a single wheel is disposed on the rear. The speed change transmission has a shift spindle on the same side as the vehicle door and a shift control mechanism includes a shift lever in the driver's compartment on the other side of the vehicle with a laterally extending rod mounted on the floor to transmit the shift selection motion to an operating wire and then to the transmission.

5 Claims, 3 Drawing Figures

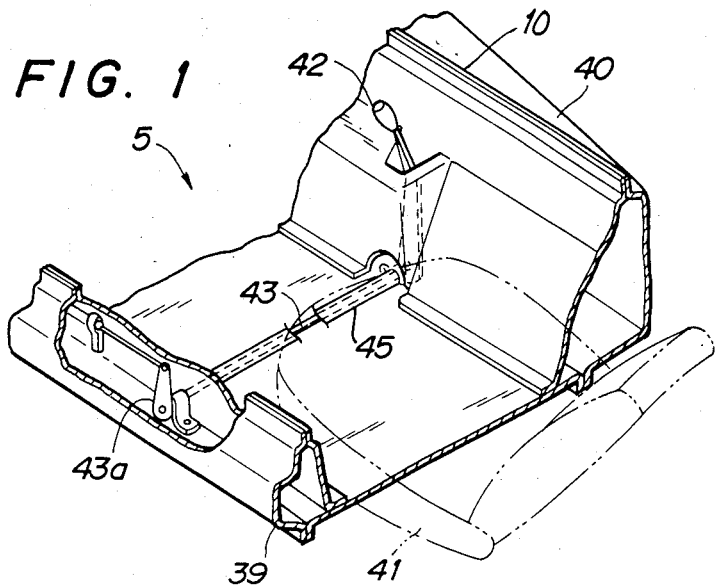
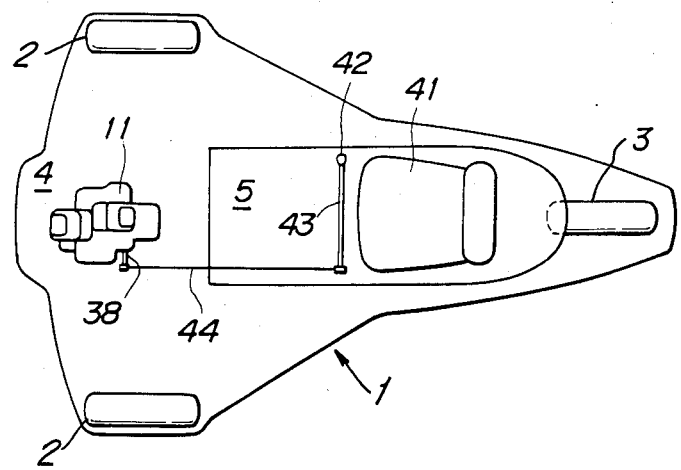
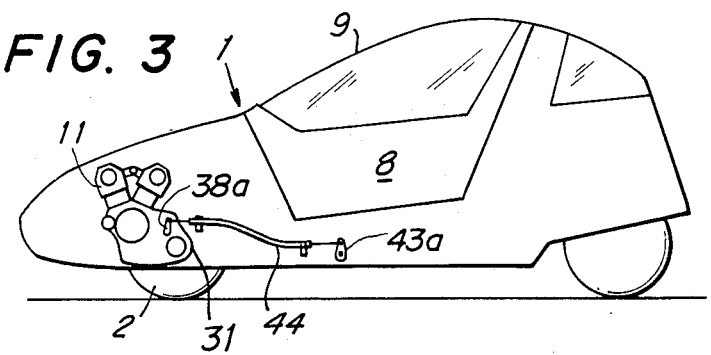

THREE-WHEELED MOTOR VEHICLE GEAR SHIFT MECHANISM

The present invention relates to a three-wheeled vehicle, and more particularly to a gear shift mechanism for a small three-wheeled motor vehicle driven by an engine suitable for normal highway operation.

Small three-wheeled vehicles are desirable from the standpoint of economical operation and to achieve the maximum economy it is necessary to make the vehicle as compact and light as possible. However, this often results in design problems involving other portions of the vehicle. One such problem occurs with respect to the transmission shifting mechanism to be operated by the driver in view of the door opening being on the same side as the transmission operating lever whereby the shift selector would be in the way of an operator entering or leaving the vehicle.

Thus, it is an object of this invention to provide an effective gear shifting mechanism on the opposite side of the driver's compartment from the door which can efficiently operate the transmission lever located on the same side of the vehicle as the door.

A further object of this invention is to provide a three-wheeled motor vehicle which includes a transmission integral with the engine and a control mechanism for controlling the transmission. The control mechanism includes a shift lever operatively connected to a gear shift spindle of the transmission through a rod rotatably attached to the floor of the driver's compartment and extending across the compartment laterally to the vehicle body and also through a connector mechanism.

The above and further objects, details and advantages of the present invention will become more apparent from the following detailed description of a preferred embodiment thereof, when read in conjunction with the accompanying drawings.

FIG. 1 is a fragmentary perspective view, partly broken away, of a driver's compartment, showing a control mechanism for a transmission in a three-wheeled motor vehicle such as shown in FIGS. 2 and 3.

FIG. 2 is a plan view of a three-wheeled vehicle having two front wheels which is illustrative of an arrangement of the control mechanism shown in FIG. 1; and FIG. 3 is a side elevational view showing the control mechanism of FIGS. 1 and 2.

FIGS. 1 through 3 show the appearance of a three-wheeled motor vehicle constructed in accordance with the preferred embodiment of the present invention. The three-wheeled motor vehicle comprises a vehicle body 1, a pair of laterally spaced front wheels 2 rotatably supported on the vehicle body 1, and a single rear wheel 3 rotatably supported on the vehicle body 1 and spaced rearward from the front wheels 2. The vehicle body 1 has a front engine room 4 and a rear compartment 5.

The vehicle body 1 has a door 8 including a windshield 9. As shown in FIG. 3, the door 8 covers most of the left side of the compartment 5, the entire upper side of the compartment 5, and the upper portion of the right side of the compartment 5, and is hinged to the upper edge 10 of a righthand side wall of the vehicle body 1.

A V-type two-cylinder engine 11 is disposed in the engine room 4 with the crank shaft extending laterally to the vehicle body 1. The engine 11 includes a lower integral transmission case 31 having an output drive shaft operatively coupled to the front wheels 2. Accordingly, the drive system of the illustrated three-wheeled motor vehicle is of the front-engine front-drive type.

As shown in FIGS. 2 and 3, a gear shift spindle 38 projects from the lefthand side of the transmission case 31. A gear selection change or shift can be made in response to rotation of the gear shift spindle 38. As can readily be understood, a wide variety of engines with transmissions for motorcycles are usable for the illustrated engine construction.

As illustrated in FIG. 1, the compartment 5 of the monocoque vehicle body 1 has a lefthand side sill 39 and a righthand side body member 40 of a relatively increased height. The door 8 is of a gull-wing type hinged to an upper edge 10 of the side body member 40 and extends laterally to the side sill 39 for covering the compartment 5. As shown in FIGS. 1 and 2, a shift lever 42 is disposed in the side body member 40 at a position in front of a driver's seat 41 so as not to interfere with the driver while getting into or out of the compartment 5, the shift lever 42 having a knob projecting into the compartment 5. Therefore, the gear shift spindle 38 and the shift lever 42 are located on opposite sides, i.e., lefthand and righthand sides, of the vehicle body 1. A rod 43 extends laterally of the vehicle body 1 across the compartment 5 and has a righthand end connected to a lower end of the shift lever 42. The lefthand end of the rod 43 is coupled through a connector mechanism 44 to the gear shift spindle 38 of the transmission in the engine room 4. More specifically, the rod 43 is inserted in a tubular attachment member 45 fixed to the floor of the compartment 5 so that the rod 43 is rotatably attached to the compartment floor. The connector mechanism is composed of crank members 38a, 43a fixed respectively to the gear shift spindle 38 and the rod 43 and a tube-encased wire 44 extending between and connected to the crank members 38a, 43a.

In operation, actuation of the shift lever 42 turns the rod 43 about its own axis to cause the connector mechanism 44 to turn the gear shift spindle 38 for thereby making a gear shift in the transmission mechanism in the transmission case 31. Since the rod 43 and tubular attachment member 45 extends from one side to the other of the compartment transversely of the vehicle body 1 and are fixed to the compartment floor, the rod 43 and member 45 can also serve as a vehicle body reinforcement for increasing the mechanical strength of the vehicle body 1 against a torsional moment caused by external forces imposed on the vehicle body 1.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A three-wheeled motor vehicle having a body, two front wheels and one rear wheel with an engine mounted in a front section of the vehicle body containing said front wheels, comprising, a transmission formed integrally with said engine and having a gear shift spindle projecting from one side thereof, a control mechanism for controlling said transmission, said vehicle body including a passenger compartment having a floor, and said control mechanism comprising a rod rotatably secured to said floor via an attachment member, and both said rod and said attachment member extending laterally of said vehicle body across substantially all of said compartment, a shift lever coupled to one end of said rod at a right angle thereto, and connector means coupling the other end of said rod to said gear shift spindle, wherein the control mechanism rod only is rotated about its axis by movement of said shift lever longitudinally to said vehicle body.

2. The vehicle of claim 1 wherein the vehicle body includes a single door openable on a side of the compartment opposite to that of the shift lever.

3. The vehicle of claim 1 wherein the control mechanism and said attachment member provide for mechanical reinforcement of the vehicle body against external forces.

4. A three-wheeled motor vehicle having a body, two front wheels and one rear wheel with an engine mounted in a front section of the vehicle body containing said front wheels comprising a transmission formed integrally with said engine and having a gear shift spindle projecting from one side thereof, a control mechanism for controlling said transmission and having an attachment means for attaching said control mechanism to the vehicle body, wherein the vehicle body includes a passenger compartment having a floor, and the control mechanism and attachment means extend laterally of the vehicle body across substantially all of said compartment, with the attachment means rotatably securing said control mechanism to the floor, providing mechanical reinforcement to the vehicle body against external forces, a shift lever coupled to one end of the control mechanism at a right angle thereto, and connector means coupling the other end of the control mechanism to the gear shift spindle, wherein, the control mechanism only is rotated about its axis by movement of said shift lever longitudinally to said vehicle body.

5. The vehicle of claim 4 wherein the vehicle body includes a single door openable on a side of the compartment opposite to that of the shift lever.

* * * * *